United States Patent [19]

Gnaedinger

[11] 4,075,504
[45] Feb. 21, 1978

[54] POWER SUPPLY APPARATUS

[75] Inventor: Donald J. Gnaedinger, Highland, Ill.

[73] Assignee: Basler Electric Company, Highland, Ill.

[21] Appl. No.: 798,483

[22] Filed: May 19, 1977

[51] Int. Cl.² ............................................ H02J 9/00
[52] U.S. Cl. ................................ 307/66; 307/10 BP; 320/35
[58] Field of Search ................ 307/9, 10 R, 10 BP, 307/64, 66, 150, 155; 320/35, 36; 363/53

[56] References Cited

U.S. PATENT DOCUMENTS

| 3,538,415 | 11/1970 | Wilson | 320/35 X |
| 3,842,288 | 10/1974 | Bradshaw | 307/10 R |
| 4,015,171 | 3/1977 | Miller | 363/53 X |

Primary Examiner—William M. Shoop
Attorney, Agent, or Firm—Koenig, Senniger, Powers and Leavitt

[57] ABSTRACT

Apparatus for supplying electrical power to d.c. loads such as lights, pumps and the like in a recreational vehicle. A converter is connected to an a.c. power source external to the vehicle to convert a.c. power therefrom to d.c. power and to supply the d.c. power produced to the loads. The converter has a maximum d.c. current output rating. A chargeable battery supplies d.c. power to the loads when an external a.c. power source is unavailable. A battery charging circuit is supplied with d.c. power by the converter for charging the battery so it has sufficient stored energy to supply d.c. power to the loads. The converter supplies power to the battery charging circuit concurrently with the supply of d.c. power to the loads. The power demand on the converter both by the d.c. loads and the battery charging circuit is sensed and the supply of power to the battery charging circuit is interrupted when the demand reaches a predetermined level whereby charging of the battery is thereupon interrupted and all the d.c. power up to the maximum current output rating of the converter is made available to the d.c. loads.

10 Claims, 2 Drawing Figures

POWER SUPPLY APPARATUS

BACKGROUND OF THE INVENTION

This invention relates to power supply apparatus and more particularly to such apparatus for supplying power to d.c. loads in a recreational vehicle or the like.

Recreational vehicles (RV's) are typically equipped with electric lights, pumps and other equipment which require d.c. power to operate. To power these loads many RV's are equipped with both a storage battery and a power supply or power pack including an a.c. to d.c. power converter. The converter supplies power to the loads when an a.c. electrical outlet is available at a campsite. Otherwise, the loads are supplied with power from the battery. A battery charging circuit is usually provided so that the converter may also charge the battery. However, as the converter concurrently supplies both the battery charging circuit and any d.c. loads that are energized, the maximum power that can be supplied to the d.c. loads cannot properly exceed the capacity of the converter less the charging current drawn by the battery. For example, if the converter has a maximum current output rating of 30 amps and the charger is rated at 10 amps, only 20 amps will be available to supply the d.c. loads when the battery is discharged. However, when the battery is fully charged 30 amps can be supplied to the d.c. equipment loads. As a consequence, the power supply had to be derated so that its rated capacity for supplying the RV d.c. equipment is a value corresponding to its converter's maximum capacity less that portion of its capacity required by the charging circuit when recharging a fully discharged battery. Thus, even though the full converter output is available to supply d.c. loads within the RV, once the battery is charged, its rating had to be reduced to a fraction of that value.

SUMMARY OF THE INVENTION

Among the several objects of the present invention may be noted the provision of apparatus for converting a.c. to d.c. power to supply d.c. loads such as lights and pumps in a recreational vehicle and to charge a battery; the provision of such apparatus which will supply d.c. power to the loads when an external a.c. power source is unavailable; the provision of such apparatus which can operate properly and safely at a rating equal to the total rated output of the converter but will also permit charging of the battery; and the provision of such apparatus which is rugged in construction, economical in cost and convenient to install and operate.

Briefly, apparatus of the present invention comprises a converter for connection to an a.c. power source external to the vehicle to convert a.c. power therefrom to d.c. power and to supply the d.c. power produced to d.c. loads such as lights, pumps and the like in a recreational vehicle or the like. The converter has a maximum current output rating. A chargeable battery supplies d.c. power to the loads when an external a.c. power source is unavailable. A battery charging circuit is supplied with d.c. power by the converter for charging the battery so it has sufficient stored energy to supply d.c. power to the loads. The converter supplies power to the battery charging circuit concurrently with the supply of power to the d.c. loads. Means is provided which is responsive to the power demand presented to the converter by the d.c. loads and the battery charging circuit to interrupt the supply of power to the battery charging circuit when the demand reaches a predetermined value whereby charging of the battery is interrupted and all the d.c. power up to the maximum current output rating of the converter is thereupon made available to the d.c. loads. Other objects and features will be in part apparent and in part pointed out hereinafter.

BRIEF DESCRIPTION OF THE DRAWINGS

Corresponding reference characters indicate corresponding parts throughout the drawings.

DESCRIPTION OF A PREFERRED EMBODIMENT

Figure 1:
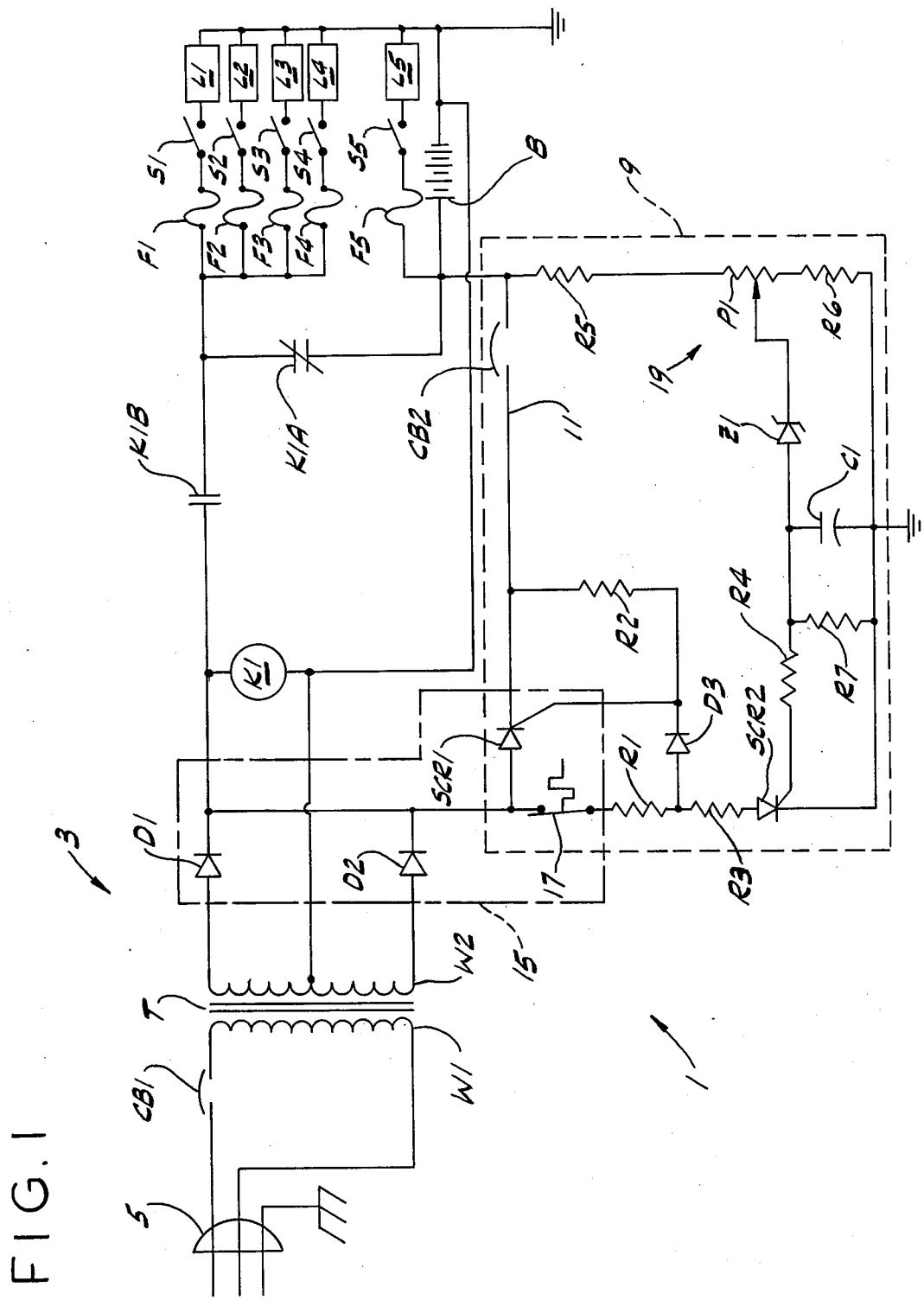
FIG. 1 is a schematic circuit diagram of a power supply apparatus of the present invention.

Referring now to FIG. 1, apparatus of the present invention for supplying electrical power to the d.c. equipment loads such as lights, pumps and the like in a recreational vehicle or the like is indicated in its entirety at 1 and includes a converter, generally designated 3, which may be connected to a 120 v.a.c./60 Hz a.c. power source (not shown) external to the vehicle via a suitable power connector 5. Converter 3 includes a transformer T whose primary winding W1 is across the external a.c. power source and a full-wave rectifier comprising a pair of diodes D1 and D2 is connected across secondary winding W2 of the transformer. Converter 3 converts a.c. power from the external a.c. source and supplies the d.c. power at approximately 12.5 v.d.c. to d.c. loads L1-L4. The amount of d.c. power produced by converter 3 is determined by its maximum current output rating under an established code, e.g., Underwriters' Laboratories. For example, converter 3 may have a 30 amp capacity, i.e., it can supply 30 amps of current at 12.5 v.d.c. Each load L1-L4 draws power from the converter when its respective power switch S1-S4 is closed and each load circuit is individually fused by a respective fuse F1-F4. It will be understood that d.c. loads L1-L4 shown in FIG. 1 are for illustrative purposes only and that a recreational vehicle in which power supply apparatus 1 is used may have more or fewer d.c. loads supplied with power from converter 3.

A chargeable battery B, e.g., a lead-acid storage battery, is provided to supply d.c. power to the loads when an external a.c. power source is unavailable. The battery, when fully charged, has sufficient stored energy to supply power to the loads for a period of time dependent on the battery's rated capacity. It must then be recharged if it is to continue to serve as a power source for the loads.

A battery charger 9 is supplied with d.c. power by converter 3, when the converter is connected to an external a.c. power source, for charging battery B so that it has sufficient stored energy to supply d.c. power to the loads. The battery charger is in parallel with d.c. loads L1-L4 and the converter thus supplies power to the battery charger concurrently with the supply of power to the d.c. loads. When battery B at a reduced state of charge is charged with d.c. power from converter 3, a charging current of 10 amps, for example, is initially drawn through battery charger 9 by the battery to charge it in a relatively short period of time, i.e., overnight. The actual charging current is a function of the level to which the battery has discharged and decreases as the battery becomes more fully charged. Battery charger 9 has a charging circuit 11 which includes a semiconductor device SCR1 switchable between a conducting state in which d.c. power from converter 3 is supplied to battery B to charge the battery and a non-conducting state in which the supply of d.c. power to the battery is interrupted. This semiconductor device is preferably a silicon controlled rectifier (SCR) whose anode and cathode terminals are connected in charging circuit 11 and whose gate input is supplied with d.c. power from converter 3 through a resistor R1 and a diode D3. Gating SCR1 with power from the converter maintains the SCR in its conducting state and a resistor R2 is connected between the gate input and the cathode of SCR1 to inhibit triggering of the SCR by noise transients.

Both diodes D1 and D2 generate heat and the amount of heat they produce varies as a function of the power demand on converter 3 by the loads L1-L4 and the battery charger. Rectifier SCR1 also generates heat and the amount of heat it produces is a function of the amount of d.c. power supplied to battery B and decreases as the battery is more fully charged. Both diodes D1 and D2 and rectifier SCR1 are mounted on a common heat sink, which is represented by broken line 15.

A thermally responsive switch 17 is mounted on the heat sink with diodes D1 and D2 and silicon controller rectifier SCR1 and is in heat exchange relationship with the diodes and the SCR and senses the total amount of heat generated by these elements, this amount being a function of the total power demand on converter 3 by the d.c loads and the battery charger and varying as the respective power demand of each varies. Switch 17, which may for example be a conventional bimetallic snap-acting breaker, is normally closed at normal operating temperatures and is connected in the circuit path from converter 3 to the gate input of rectifier SCR1. With the switch closed, current is supplied to the gate of the SCR keeping the SCR in its conducting state so charging current is supplied to battery B. However, when the heat sink temperature rises to a predetermined level corresponding approximately to that resulting from operation of the converter at its maximum current rating, for example 85° C. (185° F.), the contacts of switch 17 open thereby interrupting the circuit path to the SCR gate from the converter. With no gate input, the SCR switches from its conducting to its non-conducting state and the supply of charging current to battery B is interrupted. The d.c. power previously supplied to battery charger 9 by converter 3 is now available to d.c. loads L1-L4 so that all the d.c. power from the converter is available to the loads up to the maximum current rating of the converter.

With the power demand of battery charger 9 disconnected, the total power demand on the converter is decreased as is the amount of heat generated which the heat sink must dissipate. Even though the total power demand on the converter may now drop to less than the predetermined level at which battery charging is interrupted, switch 17 does not reclose. The contacts of thermal switch 17 remain open until the temperature of the heat sink drops to a temperature somewhat lower than that which caused it to open, dependent on the particular differential of the switch. Also, a delay in reclosing occurs due to the thermal inertia of the heat sink. When the temperature of switch 17 and the heat sink fall to a level, for example, 70°-75° C. (158°-167° F.) switch 17 will reclose and current is again applied to the gate of SCR1, switching the SCR into conduction. Power again is supplied from converter 3 to battery B and battery charging resumes. If the power demand on converter 3, constituted by the d.c. loads, continues at a high level, the heat sink temperature will continue at a level which will keep the switch open so that battery charging does not resume.

When battery B is charged to a predetermined level, for example, 90% or so of full charge, a battery charging operation is also terminated. For this purpose, battery charger 9 includes a second silicon controlled rectifier, SCR2. The gating signal supplied to the gate of SCR1 is also supplied to the anode of SCR2 through a resistor R3. SCR2 is normally in a non-conducting state but when switched into conduction, the gating signal to SCR1 is shunted to ground through SCR2 and SCR1 switches to its non-conducting state. The gate of SCR2 is connected to a reverse biased zener diode Z1 through a resistor R4. The cathode of diode Z1 is connected to the tap of a potentiometer P1 which forms part of a voltage divider, generally designated 19, that also includes resistors R5 and R6. The potentiometer setting is adjustable so the voltage divider output level, when the battery is charged to its predetermined level, is sufficient to cause diode Z1 to break down and conduct in a reverse direction and apply a gating signal to the gate of SCR2, switching the SCR into conduction. This removes the gating signal from the gate of SCR1 switching the SCR to its non-conducting state and terminating the charging operation. A capacitor C1 and a resistor R7 act as a noise filter for the gating circuit.

Power supply apparatus 1 further may include a relay K1 for automatically disconnecting and connecting battery B from the d.c. loads when converter 3 is respectively connected to and disconnected from an external a.c. power source. The coil of relay K1 is connected across the converter output so the relay is latched when the converter is connected to an external a.c. power source. The relay has a set of normally closed contacts K1A through which the battery supplies power to the loads. When relay K1 is latched the contacts open and the battery is disconnected from the loads. The relay further has a set of normally open contacts K1B which are closed when the relay is latched and power from the converter is supplied to the loads via this closed set of contacts. When converter 3 is disconnected from an external a.c. power source, relay K1 resets, and contacts K1B reopen while contacts K1A reclose.

Both transformer T and battery charger 9 include circuit breakers CB1 and CB2, respectively, for overload protection. A load L5, which may be a tape player or other audio equipment, is connected directly to battery B through fuse F5 so that when the power supply 1 is connected to a.c. power the unfiltered rectified a.c. is not supplied to L5. Rather, by its connection to battery B while in this mode, the battery serves as a filter for the charging current to battery B, if it is being charged, thereby avoiding hum in the audio equipment.

Figure 2:
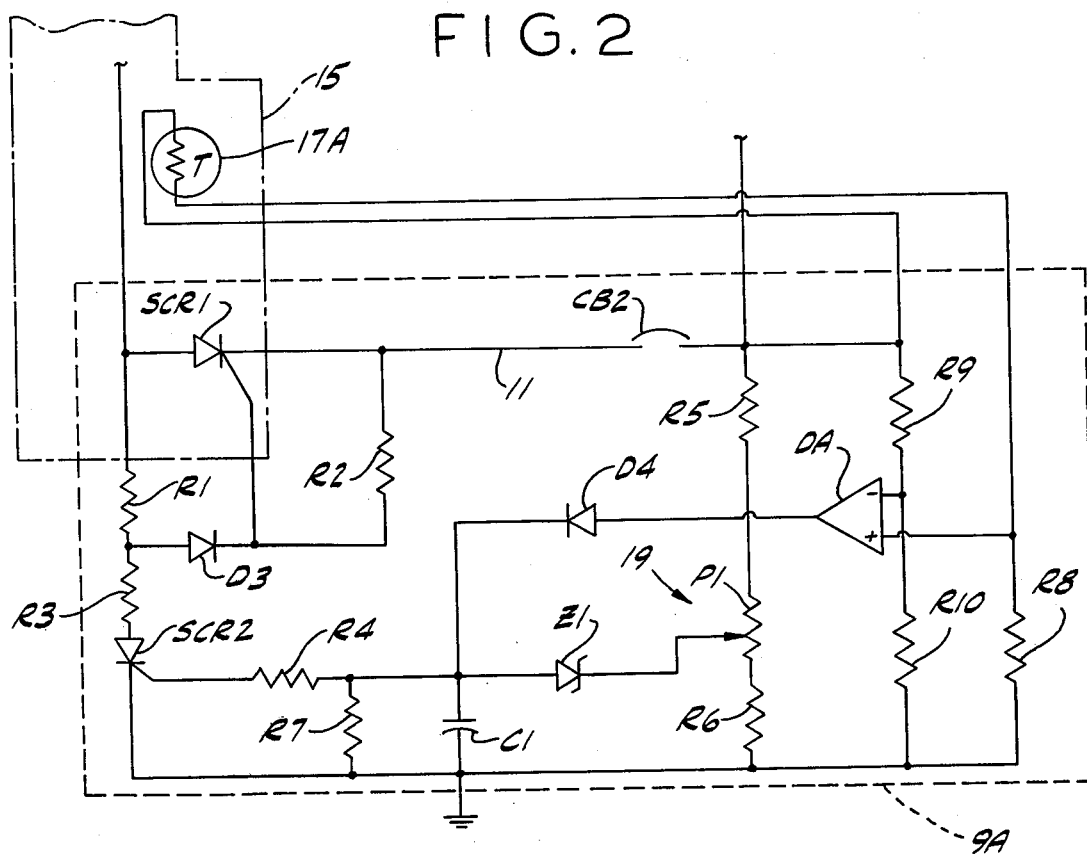
FIG. 2 is a schematic circuit diagram of an alternate battery charging section for the power supply of FIG. 1.

In accordance with the above disclosure it will be apparent to those skilled in this art that means other than the thermally responsive mechanical switch 17 will serve as an equivalent means responsive to the power demand on the converter for interrupting the supply of power to the battery charger. FIG. 2 illustrates a further embodiment of this invention in which an alternate battery charger 9A utilizes a thermistor 17A as a power sensing device or means to perform the function of the thermally responsive switch 17. Thermistor 17A is positioned on the heat sink 15 so that its resistance is a function of the total power demand on the power supply apparatus 1. Thermistor 17A is series connected with a resistor R8 directly across battery B. The junction therebetween is connected to the positive input terminal of a differential amplifier DA. Another pair of resistors, R9 and R10, are similarly serially connected across battery B with their junction connected to the negative input terminal of DA. The output terminal of DA is connected to the gate of SCR2 via a diode D4 and resistor R4. The output of amplifier DA is dependent on the level of the signal supplied to its positive input terminal relative to the level of its negative input terminal. If thermistor 17A has a negative temperature coefficient, the positive input terminal signal level will increase as the temperature of 17A increases with an increasing power demand. Normally non-conducting SCR2 will then be switched into conduction by such an ouput signal from DA which will occur when the power demand exceeds the preselected level. Conduction of SCR2 will shunt the gating signal of SCR1 switching it into its non-conducting state, all as described previously in regard to the termination of battery charger operation in response to the charge of the battery reaching say 90%. Thus, thermistor 17A functions to terminate battery charger operation in response to the total power demand on the converter exceeding a predetermined level. It will be understood that a positive temperature coefficient thermistor may be used simply by reversing the polarity of the connections to the input terminals of DA.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. Apparatus for supplying electrical power to d.c. loads such as lights, pumps and the like in a recreational vehicle or the like comprising:
   a converter adapted for connection to an a.c. power source external to the vehicle to convert a.c. power therefrom to d.c. power and to supply the d.c. power produced to the loads, the converter having a maximum current output rating;
   a chargeable battery for supplying d.c. power to the loads when an external a.c. power source is unavailable;
   means for charging the battery with d.c. power supplied by the converter so the battery has sufficient stored energy to supply d.c. power to the loads, the converter supplying power to the battery charging means concurrently with the supply of d.c. power to the loads; and
   means responsive to the power demand on the converter both by the d.c. loads and the battery charging means for interrupting the supply of power to the battery charging means when the demand reaches a predetermined level whereby charging of the battery is thereupon interrupted and all the d.c. power up to the maximum current output rating of the converter is made available to the d.c. loads.

2. Apparatus as set forth in claim 1 wherein the converter includes rectifying means generating heat the amount of which varies as a function of the total power demand on the converter and the charge interrupting means includes a thermally responsive power sensing means in heat exchange relationship with the rectifying means for interrupting the supply of power to the battery charging means when the power demand rises substantially to the level of the maximum current output rating of the converter.

3. Apparatus as set forth in claim 2 wherein the power sensing means is a thermally responsive switch.

4. Apparatus as set forth in claim 2 wherein the power sensing means includes a thermistor.

5. Apparatus as set forth in claim 2 wherein the rectifying means and the thermally responsive power sensing means are both mounted on a common heat sink.

6. Apparatus as set forth in claim 5 wherein the battery charging means includes a semiconductor device having a conducting state in which d.c. power is supplied to the battery to charge the battery, said semiconductor device generating heat the amount of which is a function of the amount of d.c. power supplied to the battery and decreases as the battery is more fully charged.

7. Apparatus as set forth in claim 6 wherein the semiconductor device is mounted on the common heat sink and the power sensing means is a thermally responsive switch also in heat exchange relationship with the semiconductor device and interconnected therewith to switch the semiconductor device into a nonconducting state and interrupt charging of the battery when the total amount of heat generated by the rectifying means and the semiconductor device reaches substantially the level of the maximum current rating of the converter, said switch switching the semiconductor device back into conduction when the total amount of generated heat falls below the aforesaid level whereby charging of the battery is resumed.

8. Apparatus as set forth in claim 7 wherein the battery charging means includes a charging circuit and the semiconductor device is a silicon-controlled rectifier whose anode and cathode terminals are connected in the charging circuit and whose gate is supplied with d.c. power from the converter through said thermally responsive switch, said thermally responsive switch being normally closed and the silicon-controlled rectifier switched into conduction but said switch opening upon the total amount of generated heat reaching said predetermined level to interrupt the flow of power from the converter to the gate input of the silicon-controlled rectifier thereby to switch the silicon-controlled rectifier to its nonconducting state.

9. Apparatus as set forth in claim 1 wherein the battery charging means includes means responsive to the battery being charged to a predetermined level to terminate battery charging.

10. Apparatus as set forth in claim 1 further including means for automatically disconnecting the battery from the d.c. loads when the converter is connected to an external a.c. power source and for automatically reconnecting the battery to the loads when the converter is not supplied with a.c. power.

* * * * *